(12) United States Patent
Moriyama et al.

(10) Patent No.: US 7,641,561 B2
(45) Date of Patent: Jan. 5, 2010

| | | |
|---|---|---|
| (54) | DUST COVER FOR A STEERING SHAFT | |
| (75) | Inventors: | Seiichi Moriyama, Gunma (JP); Hiroshi Satou, Gunma (JP); Jun Yamada, Gunma (JP); Takashi Shiba, Gunma (JP); Tomohiko Ikenoya, Kanagawa (JP); Jun Watanabe, Kanagawa (JP) |
| (73) | Assignees: | NSK Ltd., Tokyo (JP); NSK Steering Systems Co., Ltd., Tokyo (JP); Keeper Co., Ltd., Kanagawa (JP) |
| (*) | Notice: | Subject to any disclaimer, the term of this patent is extended or adjusted under 35 U.S.C. 154(b) by 323 days. |
| (21) | Appl. No.: | 10/586,091 |
| (22) | PCT Filed: | Jan. 14, 2005 |
| (86) | PCT No.: | PCT/JP2005/000368 |
| | § 371 (c)(1), (2), (4) Date: | Jul. 13, 2006 |
| (87) | PCT Pub. No.: | WO2005/068277 |
| | PCT Pub. Date: | Jul. 28, 2005 |
| (65) | Prior Publication Data | |
| | US 2008/0231003 A1 | Sep. 25, 2008 |
| (30) | Foreign Application Priority Data | |
| | Jan. 15, 2004 (JP) ............................ 2004-008194 | |
| (51) | Int. Cl. F16D 3/84 (2006.01) | |
| (52) | U.S. Cl. ........................ 464/173; 280/780 | |
| (58) | Field of Classification Search ................ 464/173; 277/635; 74/18–18.2; 280/779, 780 See application file for complete search history. | |

(56) References Cited

U.S. PATENT DOCUMENTS

| 2,088,703 | A | * | 8/1937 | Hubbard et. al. |
| 3,381,987 | A | * | 5/1968 | Husen .................... 277/635 X |
| 4,224,808 | A | * | 9/1980 | Gehrke |
| 4,616,837 | A | * | 10/1986 | Beutel .................... 277/635 X |
| 6,056,297 | A | * | 5/2000 | Harkrader et al. |

(Continued)

FOREIGN PATENT DOCUMENTS

| JP | 58-102867 | 6/1983 |

(Continued)

OTHER PUBLICATIONS

Microfilm of the specification and drawings annexed to the request of Japanese Utility Model Application No. 10845/1991 (Laid-open No. 100964/1992) (Mitsubishi Automotive Engineering Co., Ltd.), Sep. 1, 1992 Full Text; Fig. 1 (Family:none).

(Continued)

*Primary Examiner*—Greg Binda
(74) *Attorney, Agent, or Firm*—Notaro & Michalos P.C.

(57) ABSTRACT

A dust cover for a steering shaft includes a bush of low-frictional material, through which a steering shaft penetrates; a plurality of bellows made of rubber, provided in an axial direction of the steering shaft, and arranged between the bush and a panel for sealing the clearance; and an annular seal lip in contact with the outer periphery of the steering shaft.

9 Claims, 17 Drawing Sheets

U.S. PATENT DOCUMENTS

| | | | | |
|---|---|---|---|---|
| 6,350,075 | B1 * | 2/2002 | Abels | 277/635 X |
| 2006/0108782 | A1 * | 5/2006 | Kanazawa et al. | 280/779 |

FOREIGN PATENT DOCUMENTS

| | | | |
|---|---|---|---|
| JP | 06-185617 | | 7/1994 |
| JP | 07-047962 | | 2/1995 |
| JP | 08-198122 | | 8/1996 |
| JP | 09-242880 | | 9/1997 |
| JP | 09-250642 | | 9/1997 |
| JP | 2001-324018 | * | 11/2001 |
| SU | 832197 | * | 5/1981 ................. 74/18.2 |

OTHER PUBLICATIONS

Microfilm of the specification and drawings annexed to the request of Japanese Utility Model Application No. 973/07/1983 (Laid-open No. 7325/1985) (Hakusui Gomu Kogyo Kabushiki Kaisha), Jan. 19, 1985 Full Text; Figs. 1 to 3 (Family:none).

Microfilm of the specification and drawings annexed to the request of Japanese Utility Model Application No. 156028/1987 (Laid-open No. 60078/1989) (Isuzu Motors Ltd.) Apr. 17, 1989 Full Text; Figs. 1 to 4 (Family: none).

Microfilm of the specification and drawings annexed to the request of Japanese Utility Model Application No. 70433/1989 (Laid-open No. 12050/1991) (Isuzu Motors Ltd.) Feb. 7, 1991 Full Text; Figs. 1 to 4 (Family:none).

Microfilm of the specification and drawings annexed to the request of Japanese Utility Model Application No. 141517/1988 (Laid-open No. 62170/1990) (Toyoda Gosei Co., Ltd.) May 9, 1990 Full Text; Fig. 1 (Family:none).

Microfilm of the specification and drawings annexed to the request of Japanese Utility Model Application No. Laid Open No. 5-34303 [This particular non-patent reference was available to public more than one year before the earliest effective filing date.].

* cited by examiner

DUST COVER FOR A STEERING SHAFT

TECHNICAL FIELD

The present invention relates to a dust cover for a steering shaft for closing a clearance (column hole) between the steering shaft which penetrates a column hole provided on a panel separating an engine room and a vehicle compartment, and the panel. More particularly, the present invention relates to a dust cover for a steering shaft having bellows for following oblique movement of the steering shaft.

BACKGROUND ART

An automotive steering shaft is arranged so as to penetrate a panel through an opening provided on the panel which separates a vehicle compartment and an engine room. Between an edge of an opening of the panel and the steering shaft, there is provided a dust cover for the steering shaft in order to prevent rainwater, dust, the outside air, noise and the like from entering the vehicle compartment. It is unavoidable for the steering shaft to move with respect to the opening provided on the panel, such as, for example, to incline or deviate, for adjusting the height of a steering wheel, or due to vibrations or the like during automobile traveling. Accordingly, the dust cover for the steering shaft is provided with bellows. The bellows are formed of easily-deformable soft rubber material, and the deformation of the bellows allows the dust cover to follow the oblique movement of the steering shaft.

As a conventional dust cover for a steering shaft, there is one disclosed in Japanese Patent Publication No. 2001-324018. Referring to FIG. 17, the dust cover 100 for a steering shaft that has a shaft sealing portion 101 that passes the steering shaft therethrough and is in contact with the steering shaft, and two bellows portions 102 and 102 having an inner peripheral end coupled to the shaft sealing portion 101 and an outer peripheral end attached to a panel fixing member 103. The shaft sealing portion 101 and the two bellows portions 102 and 102 are formed of rubber material and are integrally formed by using metal mold. In this technique, sound insulating properties are enhanced by providing these two bellows portions 102 and 102. Also the two bellows portions 102 and 102 and the shaft sealing portion 101 passing the steering shaft therethrough, are integrally formed, so that an operation of incorporating to a vehicle body is facilitated.

Japanese Patent Publication No. 2001-324018 is citied as a material reference here.

DISCLOSURE OF THE INVENTION

Problems to be Solved by the Invention

In the technique of the Japanese Patent Publication No. 2001-324018, however, there is a problem that since the shaft sealing portion 101, along which the steering shaft rotationally slides, is constructed of the same rubber material as the bellows portion 102, a large frictional resistance occurs between the steering shaft and the shaft sealing portion 101, and that offensive sound is emitted during rotation of the steering shaft by the operation of the steering wheel since the steering shaft and the shaft sealing portion 101 rub against each other.

It is an object of the present invention to provide a dust cover for a steering shaft for preventing offensive sounds from emitting during the operation of the steering wheel, having excellent sliding properties in the axial rotation of the steering shaft, flexible follow-up properties to oblique movement of the steering shaft and high sealing properties for preventing rainwater, dust, the outside air, noise and the like from entering the vehicle compartment.

Means for Solving the Problem

In order to achieve the above objects, the present invention provides a dust cover for a steering shaft for closing a column hole between a steering shaft penetrating the column hole provided on a panel which separates an engine room and a vehicle compartment, and the panel, comprising: a bush made of low frictional material, through which the steering shaft penetrates; a main body of dust seal made of rubber, provided with a plurality of bellows in an axial direction of the steering shaft and arranged between the bush and the panel, for sealing a clearance thereof; and an annular seal lip arranged at least on the engine room side of the bush, in contact with an outer peripheral surface of the steering shaft.

Therefore, excellent sliding properties can be realized for the axial rotation of the steering shaft because of the bush made of low frictional material, and flexible follow-up properties can be realized for the oblique movement of the steering shaft because of the bellows made of rubber. Further, the plurality of bellows and seal lips provided in the axial direction of the steering shaft provides high sound insulating properties and high sealing properties for preventing rainwater, dust, the outside air, and the like from entering the vehicle compartment. In addition, since only the bush made of low frictional material having excellent sliding properties and the seal lip having a small contact area are in contact with the steering shaft, it is possible to prevent offensive sounds from emitting during the rotation of the steering shaft.

Here, the main body of dust seal may be obtained by integrally forming the plurality of bellows by continuously forming end portions of bellows on each outer periphery side. Also, the main body of dust seal may be made integral by forming the plurality of bellows separately, fitting end portions thereof on the outer periphery side into an edge of the column hole, and fitting end portions thereof on the inner periphery side into the bush. Since an annular end portion inside the plurality of bellows is fitted in the bush, the main body of dust seal can be fixed to the bush only with its tightening force. However it is preferable to provide a fixing member for surrounding the end portions of the plurality of bellows on the inner periphery side and tightening from the surrounding. Thereby, the inner peripheral end of the bellows is further tightened against the bush by the fixing member while fitted in the bush, and the bellows are reliably fastened to the bush. Moreover, the tightening force by the fixing member is received by the bush, so that the smooth rotation of the steering shaft to the bush is not prevented.

In the present invention, the fixing member may be any fixing member that has a cylindrical portion or an annular portion for surrounding the annular end portions on the inside of the plurality of bellows and fitting in the bushes for tightening. Although the material and shape thereof are not particularly limited, it is preferable, to prevent the bellows from being damaged, that the edge at the opening end for pressing the bellows be curled outside or that it have a tapered shape having a tip edge of a curved surface. The structure for fixing this fixing member to the bush may be any one of various structures, but it is preferable, for the simplification of structure, to fix to the bush by caulking an end portion of the bush in a state where, for example, the bush is fitted in the end portion of the plurality of bellows on the inner periphery side. Preferably, a hook is provided at an end portion of the bush, the hook being elastically deformed in a radial direction to allow the fixing member to pass through the hook when the fixing member is fitted into the end portion of the bush, the hook serving to prevent the fixing member fitted in the bush from coming off with a tip of the hook caught by the end portion of the fixing member after the fixing member is fitted into the bush, and the hook being used for fixing the fixing member by snap locking. According to this fixing system, the installation is completed only by an operation of fitting the fixing member into the bush for pressing.

The bellows for the main body of dust seal according to the present invention may be the one having looseness or structure capable of deformation that allows inclination or deviation of the steering shaft, and this is not limited to those having a particular shape or structure. However, it is preferable that the bellows has at least one annular projected portion formed of two inclined portions which incline in an opposite direction to each other with respect to the bush axis between an end portion on an inner periphery side and an end portion on an outer periphery side; and an apex portion continuously joining the inclined portions, and the projected portion projects toward either the engine room side or the vehicle compartment side.

In the bellows, it is more preferable that the projected portion projects on the engine room side, and the curvature of the apex portion of the bellows located closest to the vehicle compartment side be larger than the curvature of the apex portion of other bellows. In this case, the length of the bellows having a maximum amount of deformation associated with oblique movement of the steering shaft, located closest to the vehicle compartment side can be made longer than other bellows without changing the angle of inclination. Since the apex portion of the bellows located closest to the vehicle compartment side is easier to curve, the deformation of the bellows located closest to the vehicle compartment side in a radial direction is made further easier. Then, the bellows more easily follows the movement of the steering shaft.

Further, in the bellows, the apex portion of the projected portion is formed close to the end portion on the inner periphery side of the bellows or close to the end portion on the outer periphery side of the bellows. In this case, the bellows can be made longer, and a point on the projected portion which curves during oblique movement of the steering shaft is defined in the vicinity of the apex portion, and it is thus possible to prevent the bellows from buckling or creases from occurring during oblique movement of the steering shaft.

Also, in the present invention, a portion of the inclined portion of the bellows located closest to the vehicle compartment side in the vicinity of end portions of the plurality of bellows on the inner periphery side is in contact with a portion of other bellows in an initial state where no external force is exerted. In this case, depending on whether when the bellows located closest to the vehicle compartment side contracts or extends in a radial direction of the steering shaft, a basic point during deformation changes, and a stress concentration can be mitigated by preventing stresses from always concentrating on a fixed point.

In the dust cover for a steering shaft according to the present invention, the inner peripheral surface of the bush preferably has a groove for lubricant, and further even on the end portion of the bush on the vehicle compartment side, an annular seal lip in contact with the outer peripheral surface of the steering shaft is preferably provided to hold lubricant on the inner peripheral surface of the bush.

Further, preferably, in the present invention, a surface of the main body of dust seal in contact with at least an inner peripheral surface of the column hole comprises a rough surface having a reduced coefficient of friction. Also, preferably, a portion on which at least bellows themselves of the plurality of bellows of the main body of dust seal are capable of coming into contact with each other, or a portion in contact between the same bellows has a rough surface for reducing a contact area.

Effect of the Invention

A dust cover for a steering shaft of the present invention can prevent offensive sounds from emitting during the operation of the steering wheel, and achieve at the same time, excellent sliding properties in the axial rotation of the steering shaft, flexible follow-up properties to oblique movement of the steering shaft and high sealing properties for preventing rainwater, dust, the outside air, noise and the like from entering a vehicle compartment.

Also, in the present invention, when the fixing member surrounding the end portions of the plurality of bellows on the inner periphery side are provided to further tighten from the surroundings, the bellows can be reliably fixed to the bush without deteriorating the sliding properties of the steering shaft to the bush.

Figure 1:
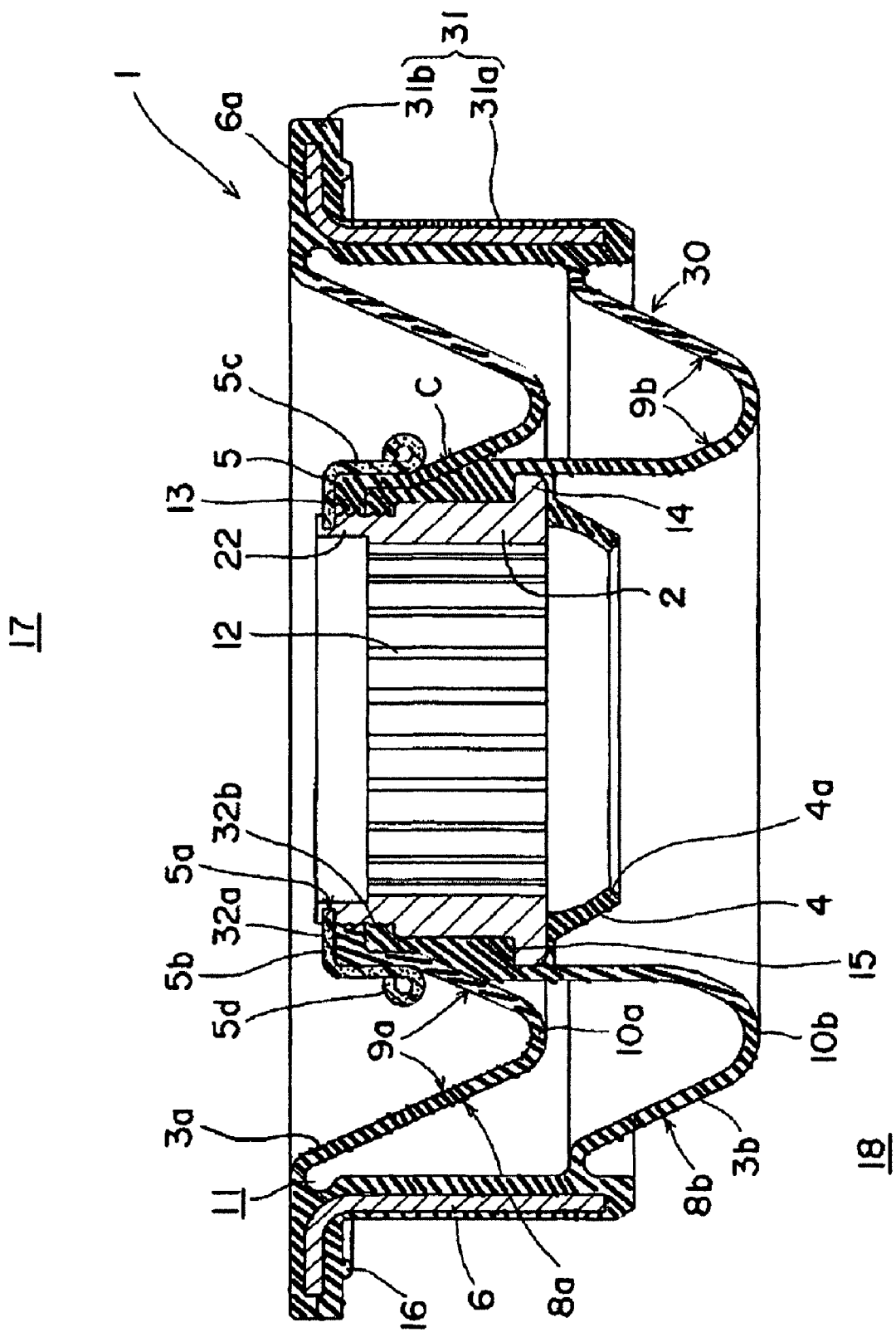
FIG. 1 shows a dust cover for a steering shaft according to an embodiment of the present invention, and is a cross-sectional view taken on line I-I of FIG. 2.
Figure 2:
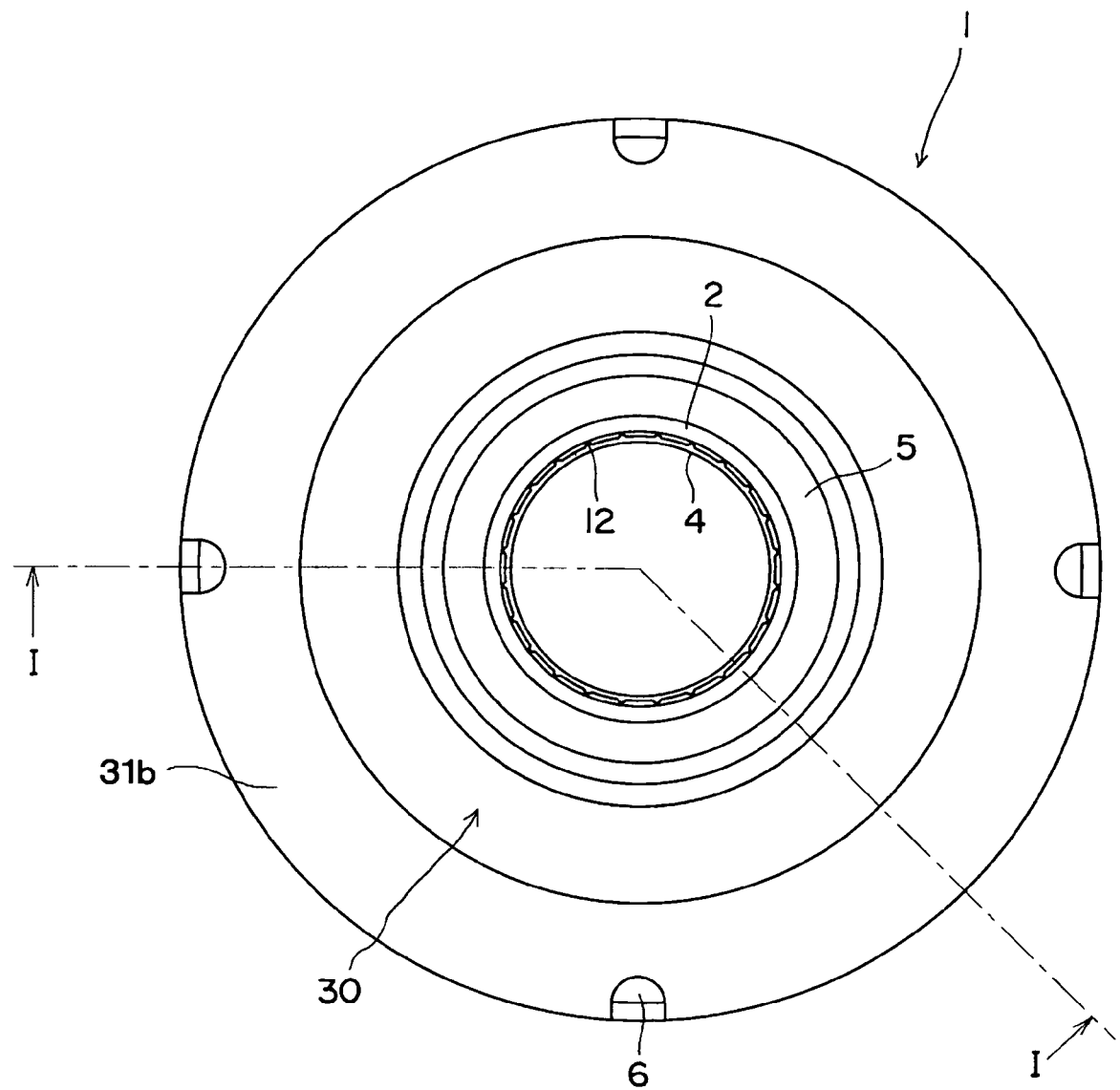
FIG. 2 is a plan view showing the dust cover for a steering shaft.

DESCRIPTION OF SINGS 1 dust cover for a steering shaft
2 bush
3a, 3b bellows
4 seal lip
5 fixing member
8a, 8b projected portion
9a, 9b inclined portion
10a, 10b apex portion
11 circular groove
12 groove formed in an inner peripheral surface
17 vehicle compartment
18 engine room
19 panel
20 steering shaft
23 hole cover
24 column hole
25 seal lip
26 hook
27 pawl portion
30 main body of dust seal
31 installation portion at outer peripheral end of bellows
31c outer peripheral surface at outer peripheral end of bellow
32 fixed portion at inner peripheral end of bellows
33 portions in which there is at least a possibility that they come into contact with each other, of bellows
c contact portion

BEST MODE FOR CARRYING OUT THE INVENTION

The structure of the present invention will now be explained in detail based on a best mode illustrated in the drawings where the same reference numerals are used to designate the same or functionally similar parts throughout the drawings.

Figure 3:
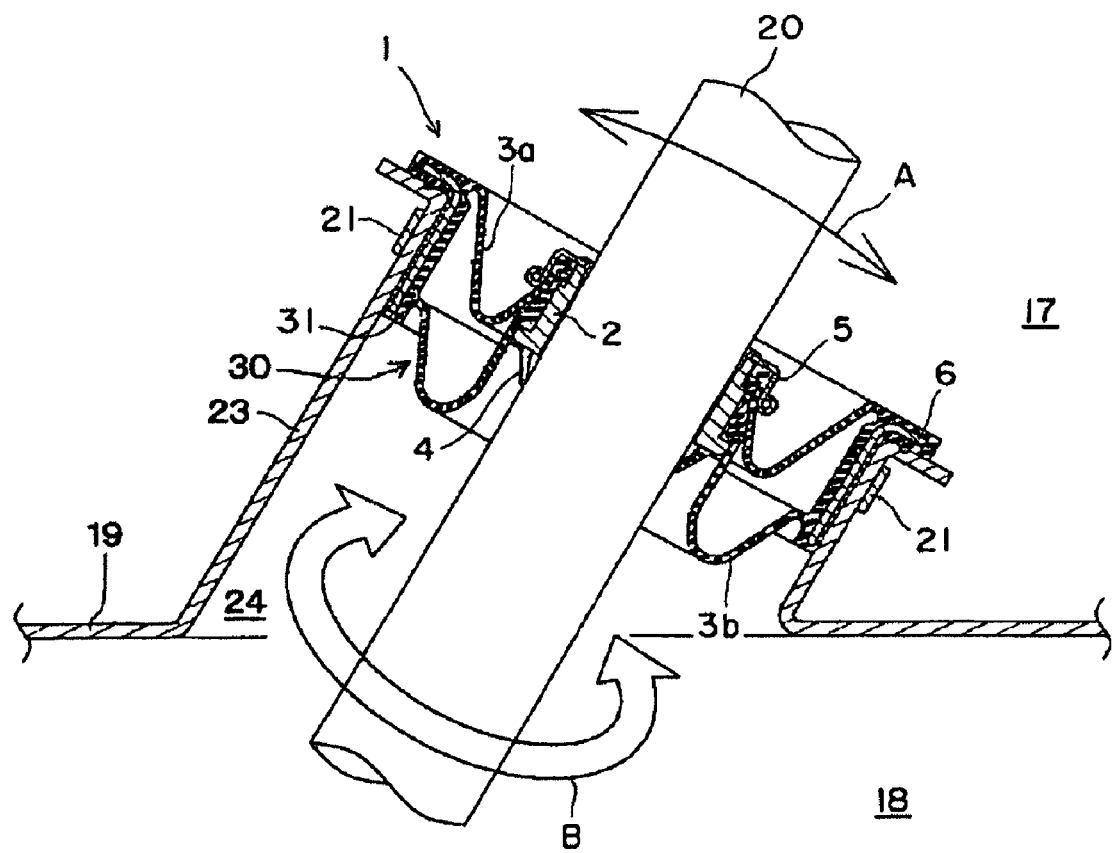
FIG. 3 is a cross-sectional view showing a state where the dust cover for a steering shaft is installed to a panel.

FIGS. 1 to 5 show a dust cover for a steering shaft according to an embodiment of the present invention. The dust cover 1 for a steering shaft, as shown in FIG. 3, is installed to a column hole 24 provided on a panel 19 for separating a vehicle compartment 17 and an engine room 18 to close a clearance (column hole 24) between the steering shaft 20 for penetrating the column hole 24 and the panel 19. The dust cover 1 for a steering shaft is constructed at least of a bush 2 made of low frictional material through which the steering shaft 20 penetrates; a main body 30 of dust seal made of rubber, having a plurality of bellows 3a and 3b in an axial direction of the steering shaft 20; and an annular seal lip 4, which is located at least the engine room 18 side of the bush 2, for coming into contact with the outer peripheral surface of the steering shaft 20. In the present embodiment, the column hole 24 is formed by a hole cover 23 which stands up from the panel 19.

The main body 30 of dust seal has a plurality of bellows in an axial direction of the steering shaft 20, for example, a first bellows 3a close to the vehicle compartment 17 side, and a second bellows 3b close to the engine room 18 side. In this case, for rubber material constituting the main body 30 of dust seal, material having high flexibility to favorably follow up an oblique movement of the steering shaft 20 is preferably used, and, for example, ethylene-propylene rubber is used in the present embodiment. Also, for the seal lip 4, in the present embodiment, for example, there is used NBR (acrylonitrile-butadiene rubber) having excellent physical properties for sealing sliding portions. However, the above-described material is a suitable exemplification, and other materials may be used. In this respect, in the present embodiment, the description is mainly made of a case where two bellows: first and second 3a and 3b are provided, and if necessary, there may be provided three or more bellows.

The main body 30 of dust seal according to the present embodiment is integrally formed by using, for example, metal mold, and has such a shape that each outer peripheral end of the first and second bellows 3a and 3b is continuous. This portion at the continuous outer peripheral end is an installation portion 31 which is fitted into the hole cover 23 for forming the column hole 24 on the panel 19 which separates the vehicle compartment 17 and the engine room 18. This installation portion 31 is constructed of a tubular portion 31a abutting against the inner peripheral surface of the hole cover 23; and a flange portion 31b abutting against the peripheral edge of the installation hole, and within the interior of the installation portion 31, there is laid a tubular reinforcement member 6 made of metal, having a collar 6a. The first and second bellows 3a and 3b are made integral, whereby an assembly operation of the dust cover 1 for a steering shaft and an installation operation to the hole cover 23 can be performed simply. Also, since the first and second bellows 3a and 3b are made integral at the installation portion 31 of the outer peripheral end and it becomes easier to arrange the bush 2, which is a separate member, on the inner peripheral end side of these bellows 3a and 3b, the assembly operation of the dust cover for the steering shaft becomes easier, and further, the installation operation of the dust cover 1 for the steering shaft to the panel can be performed easily. In this respect, the reinforcement member 6 is not limited to a member made of metal.

The ends on each inner periphery side of the first and second bellows 3a and 3b are annular fixed portions 32a and 32b to be fitted in the outer peripheral surface of the bush 2, respectively. Thus, between each fixed portion 32a, 32b and the installation portion 31, there are formed projected portions 8a, 8b projecting toward the engine room 18 side respectively. Each projected portion 8a, 8b has an inclined portion 9a, 9b inclining in an opposite direction to each other with respect to the steering shaft 20, respectively, forms a mountain shape that rises toward the engine room 18 side and is continuous in an annular shape, and has one apex portion 10a, 10b ranging in an annular shape which forms the top of each mountain. These projected portions 8a and 8b make deformation such as curving, developing or deflection to thereby allow oblique movement of the steering shaft 20 during adjustment of height of the steering wheel or the like, and to absorb vibrations of the steering shaft 20 during automobile traveling or the like. An arrow A in FIG. 3 represents a direction of an oblique movement of the steering shaft 20. In this respect, although the projected portion 8a, 8b according to the present embodiment has a shape projecting toward the engine room 18 side or the engine room, it may have a shape projecting toward the vehicle compartment 17 side if necessary. Also, although the projected portion 8a, 8b according to the present embodiment has a shape having one apex portion 10a, 10b, it may have a shape having a plurality of apex portions 10a, 10b if necessary.

Here, when the steering shaft 20 inclines with respect to a direction indicated by an arrow A of FIG. 3, the first bellows 3a, which is farther from a center of rotation of the oblique movement, has a larger amount of deformation than the second bellows 3b, which is close to the center of rotation thereof. Thus, in the present embodiment, the curvature of the apex portion 10a of the first bellows 3a located closest to the vehicle compartment 17 side is made larger than the curvature of the apex portion 10b of the second bellows 3b. In other words, a curvature radius of the apex portion 10a is made smaller than that of the apex portion 10b. With the features as described above, length of the inclined portion 9b in the first bellows 3a can be made longer than the inclined portions 9a, 9b of the second bellows 3b without changing an angle of the inclined portion 9a of both bellows 3a, 3b, and since the apex portion 10a of the first bellows 3a becomes easier to flex, the first bellows 3a can be made easier to become deformed larger in a radial direction of the steering shaft 20 than the second bellows 3b. Thereby, the follow-up properties of the main body 30 of dust seal to inclination or deviation or the like of the steering shaft 20 can be improved.

Also, in the present embodiment, the apex portion 10a, 10b of each projected portion 8a, 8b is formed to offset closer to a fixed portion 32a, 32b than an intermediate position between the fixed portion 32a, 32b and the installation portion 31. With the features as described above, it is possible to make development length of the first or second bellows 3a, 3b longer, a point on the projected portion 8a, 8b which curves during oblique movement of the steering shaft 20 is defined in the vicinity of the apex portion 10a, 10b, and it is possible to prevent the main body 30 of dust seal from buckling or creases from occurring during oblique movement of the steering shaft 20. By preventing buckling or occurrence of creases of the main body 30 of dust seal, the durability of the main body 30 of dust seal can be improved. In this respect, the offset in the apex portion 10a, 10b of the projected portion 8a, 8b may be located closer to the installation portion 31 than intermediate position between the fixed portion 32a, 32b and the installation portion 31. In this case, a similar effect can be obtained.

Further, in the present embodiment, a portion of an inclined portion 9a of the first bellows 3a located closest to the vehicle compartment 17 side is caused to come into contact with a portion of the second bellows 3b in an initial state where no external force is exerted on the dust cover 1 for a steering shaft. This contact portion is indicated by a symbol C in FIG. 1. With the features as described above, a basic point during deformation, that is, a curving point on the fixed portion 32a side in the projected portion 8a of the first bellows 3a changes depending on whether the first bellows 3a contracts or extends in a radial direction of the steering shaft 20, and it is possible to prevent stress from being always concentrated on a fixed point. Particularly, by dispersing stress concentration points of the first bellows 3a having larger amount of deformation than the second bellows 3b, it is possible to improve the total durability of the main body 30 of dust seal.

Also, in a corner portion inside a coupled point between the first bellows 3a of the main body 30 of dust seal and the installation portion 31, a circular groove 11 is formed in an annular shape so as not to form any sharpness so that it is difficult to cause stress concentration. In the case of the main body 30 of dust seal according to the present embodiment, since the first and second bellows 3a and 3b are coupled together through the installation portion 31 to integrally form together with the reinforcement member 6, during pattern draw, the first bellows 3a is rolled up to draw out from the mold. During the pattern draw, it is possible to prevent stress concentration on a coupled point between the first bellows 3a and the installation portion 31, and to prevent the main body 30 of dust seal from being damaged during pattern draw. A corner portion at a coupled portion between the second bellows 3b and the installation portion 31 is also made into a circular corner portion free from sharpness, and it is difficult to cause stress concentration.

Figure 4:
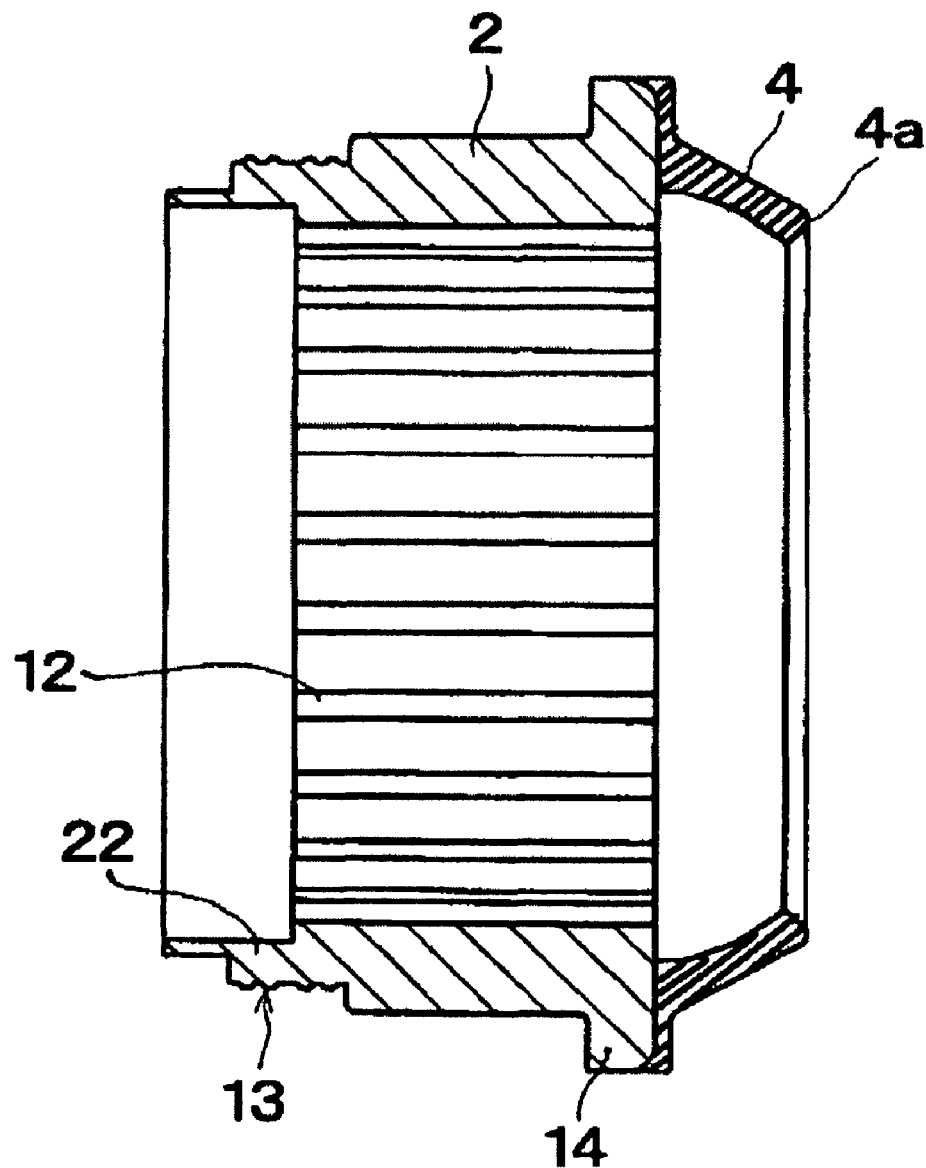
FIG. 4 is a cross-sectional view showing a shape of a bush in the dust cover for a steering shaft shown in FIG. 1.

The bush 2 is formed in a tubular shape having a hole diameter for allowing the steering shaft 20 to penetrate as shown in FIGS. 1 and 4, and on the inner peripheral surface which the steering shaft 20 slidably contacts with, there is provided at least one groove 12 for holding grease as lubricant mainly. Any shape and any number of grooves 12 may be used as long as they serve to hold grease, and any of straight-line shape, helical shape and annular shape is acceptable, but under the consideration of pattern draw during forming of the bush 2, a groove 12 is preferably one of a straight-line extending in the axial direction of the steering shaft 20. The number of grooves 12 is not particularly limited, but preferably a plurality of grooves 12 are provided, and more preferably, a plurality of grooves 12 are provided at regular intervals in the circumferential direction. Grease as lubricant is held on this groove 12, whereby the steering shaft 20 can be rotationally slid on the bush 2 for a longer time period and more smoothly. An arrow B in FIG. 3 denotes a direction of rotation of the steering shaft 20.

A low-frictional material constituting the bush 2 has excellent sliding properties, that is, a low coefficient of friction, and may preferably be a rigid low-frictional material having such a degree of rigidity that does not easily become deformed by rotation or oblique movement of the steering shaft 20 or by a tightening force of the fixing member. For example, in the present embodiment, polyamide resin is used, but metallic material such as polytetrafluoroethylene resin, aluminum or the like may be used. Also, polyacetal or oleo-resin may be used.

On the outer peripheral surface of the bush 2, there are formed a fitted-in portion 22 in which each fixed portion 32a, 32b of the first, second bellows 3 is fitted, and a stepped portion 14 for preventing the main body 30 of dust seal from coming off. In the case of the present embodiment, the stepped portion 14 is formed by a flange formed on one end portion of the bush 2, for example, the end portion on the engine room 18 side. Also, on an end portion at a side opposite to the end portion on which the flange 14 of the bush 2 is formed, that is, on an end portion on the vehicle compartment 17 side, there is fixed an installation portion and fixing member 5. In the outer peripheral surface of the fitted-in portion 22, a plurality of annular convex portions 13 are formed, and on the inner periphery of each fixed portion 32a, 32b of the first, second bellows 3a, 3b, there are formed annular grooves in which the convex portions 13 fit. The convex portions 13 are fitted in the grooves of the fixed portion 32a, 32b, whereby the sealing properties between the bush 2 and the first, second bellows 3a, 3b is enhanced, and the first, second bellows 3a, 3b is prevented from deviating and coming off from the bush 2. On the second bellows 3b to be arranged on the engine room 18 side, there is formed a stepped portion 15 which is caught by a flange 14 formed on the bush 2. Therefore, the fixed portion 32a, 32b of the first, second bellows 3a, 3b is sandwiched and fixed between the fixing member 5 and the flange 14; the fixing member 5 prevents the main body 30 of dust seal from coming off toward the vehicle compartment 17 side; and the flange 14 prevents the main body 30 of dust seal from coming off toward the engine room 18 side.

Also, at an end portion of the bush 2 on the engine room 18 side, there is provided a seal lip 4. For example, in the present embodiment, the seal lip 4 and the bush 2 are insert-formed, whereby the bush 2, which is a separate member, and the seal lip 4 are made integral. The seal lip 4 has a lip portion 4a continuously in contact with the outer periphery of the steering shaft 20 for sealing. The seal lip 4 prevents rainwater, dust and the like from the engine room 18 from entering, and prevents lubricating grease from flowing out toward the engine room 18 side.

The main body 30 of dust seal for closing a clearance (column hole) between the bush 2 and the hole cover 23 is fixed to the bush 2 only with its tightening force because an annular end portion inside each the first, second bellows 3a, 3b, that is, a fixed portion 32a, 32b is fitted in the bush 2, and is more reliably fixed by further tightening from the surroundings by the fixing member 5. Thus, the dust cover 1 for a steering shaft according to the present embodiment uses the fixing member 5 for tightening the fixed portion 32a, 32b of the end portion of a plurality of bellows 3 on the inner periphery side to thereby press and fix the bush 2. In this case, the fixed portion 32a, 32b of the bellows 3 at the inner periphery end is sandwiched between the bush 2 and the fixing member 5 and restrained to the bush 2. Since a tightening force which the fixing member 5 gives to the fixed portion 32a, 32b at each inner periphery end is received by the bush 2, smooth rotation of the steering shaft 20 is not prevented. In other words, the bellows 3 can be reliably fixed to the bush 2 without deteriorating the sliding properties of the steering shaft 20 to the bush 2.

Figure 5:
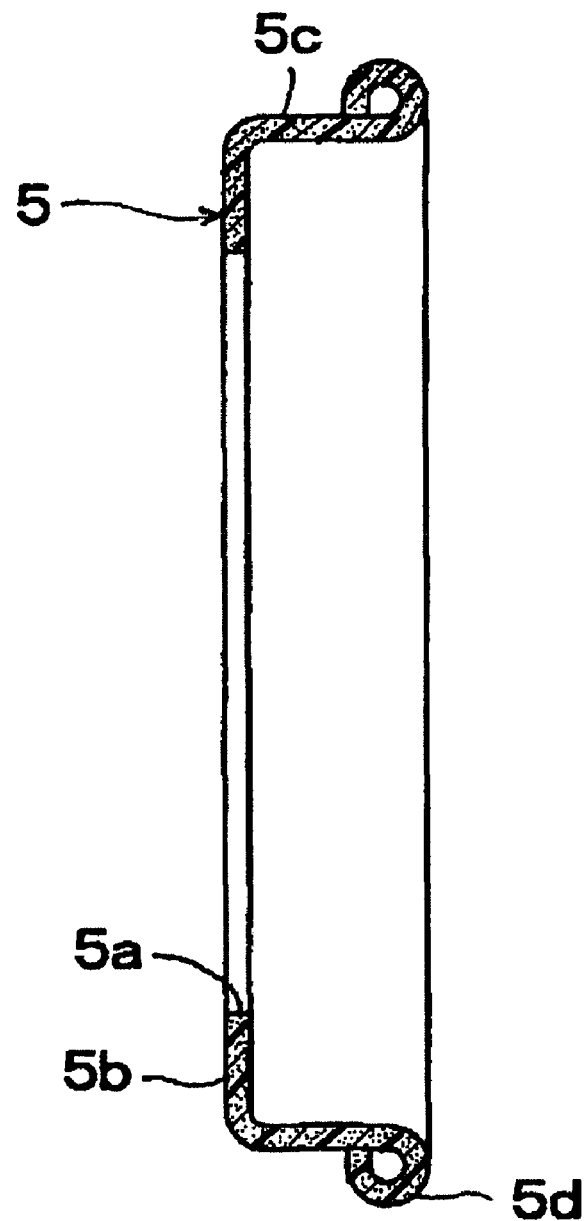
FIG. 5 is a cross-sectional view showing a shape of a fixing member in the dust cover for a steering shaft shown in FIG. 1.

The fixing member 5 is formed in such a shallow cup-shape as shown in FIG. 5, made of, for example, metal, and is constructed of a circular plate portion 5b having a circular opening 5a; and a tube portion 5c made integral with this circular plate portion 5b. An edge of the opening 5a of the circular plate portion 5b is fixed to the bush 2, and abuts against an end surface of the fixed portion 32a of the first bellows 3a on the vehicle compartment 17 side to thereby prevent the main body 30 of dust seal from coming off toward the vehicle compartment 17 side. The tube portion 5c presses the fixed portion 32a, 32b of the first, second bellows 3a, 3b against the bush 2, to fasten the first, second bellows 3a, 3b to the bush 2.

The end portion 5d of the tube portion 5c is curled outside such that on the edge which is in contact with the first bellows 3a of the fixing member 5, no sharpness is formed. Thereby, even if the first bellows 3a may be in contact with the edge of the fixing member 5 when the first bellows 3a becomes deformed, it is possible to prevent the first bellows 3a from being damaged. The fixing member 5 of the above-described shape can be manufactured by, for example, drawing.

The dust cover 1 for a steering shaft according to the present embodiment is assembled, for example, by the following method using: the bush 2 made integral with the seal lip 4; the main body 30 of dust seal comprising the first and second bellows 3a and 3b integrated with each other; and the fixing member 5. First, the fixed portion 32b of the second bellows 3b is inserted into the fitted-in portion 22 of the bush 2 for fitting in until the stepped portion 15 bumps against the flange 14, and next, the fixed portion 32a of the first bellows 3a is fitted into the fitted-in portion 22 of the bush 2 and the fixed portion 32b of the second bellows 3b. At this time, one portion of the inclined portion 9a of the first bellows 3a, that is, the inclined portion 9a in the vicinity of the fixed portion 32a comes into contact with one portion of the second bellows 3b, that is, an inclined surface portion C of the fixed portion 32b. Next, the fixing member 5 is fitted into the bush 2; the fitted-in portion 22 of the bush 2 is caused to penetrate the opening 5a in the circular plate portion 5b; the tube portion 5c is pressed in to cover the fixed portion 32a, 32b of the first, second bellows 3a, 3b therewith; and the fixed portion 32a, 32b of the first, second bellows 3a, 3b is caused to tighten the bush 2 with the tube portion 5c. In this state, the end portion of the fitted-in portion 22 of the bush 2 projected out of the opening 5a of the fixing member 5 is plastically deformed by heating in the case of the bush made of synthetic resin, or is caulked in the case of the bush made of light metal, and the fixing member 5 is fixed to the bush 2. Thus, the dust cover 1 for a steering shaft is assembled.

The installation portion 31 of the dust cover 1 for a steering shaft assembled is fitted in the hole cover 23 as shown in FIG. 3. Reference numeral 21 in FIG. 3 denotes a band for fixing the dust cover 1 for a steering shaft to the hole cover 23. On a surface which opposes to the hole cover 23 in the flange portion 31b of, for example, the installation portion 31, there is formed an annular convex portion 16, and this convex portion 16 fits into an annular groove formed on the peripheral edge of the installation hole in the hole cover 23, whereby the sealing properties between the hole cover 23 and the main body 30 of dust seal is enhanced, and it is possible to prevent the dust cover 1 for a steering shaft from deviating with respect to the hole cover 23.

According to this dust cover 1 for a steering shaft, since for the bush 2, low-frictional material is used, and for the bellows 3, rubber material is used, it is possible to achieve both the excellent sliding properties in the axial rotation of the steering shaft 20 indicated by an arrow B in FIG. 3 and the flexible follow-up properties to oblique movement of the steering shaft 20 indicated by an arrow A in FIG. 3. Further, the two bellows 3a and 3b placed in juxtaposition in an axial direction of the steering shaft 20 and the seal lip 4 can provide high sound insulating properties and high sealing properties for preventing rainwater, dust, the outside air and the like from entering the vehicle compartment 17. In addition, since the contact with the steering shaft 20 in the dust cover 1 for a steering shaft is provided by means of the bush 2 made of low-frictional material having favorable sliding properties and the seal lip 4 made of NBR having a small contact area and favorable sliding properties, there is no possibility that offensive sounds occur during the rotation of the steering shaft 20. Further, even if a fitting-in force for fastening the main body 30 of dust seal to the dust cover 1 for a steering shaft may be strong, it is possible to prevent rotational sliding properties of the steering shaft 20 from being deteriorated by the fitting-in force since the fitting-in force is received by the bush 2. Also, since the main body 30 of dust seal is a separate member from the seal lip 4, optimum material can be selected in accordance with the respective functions.

Figure 6:
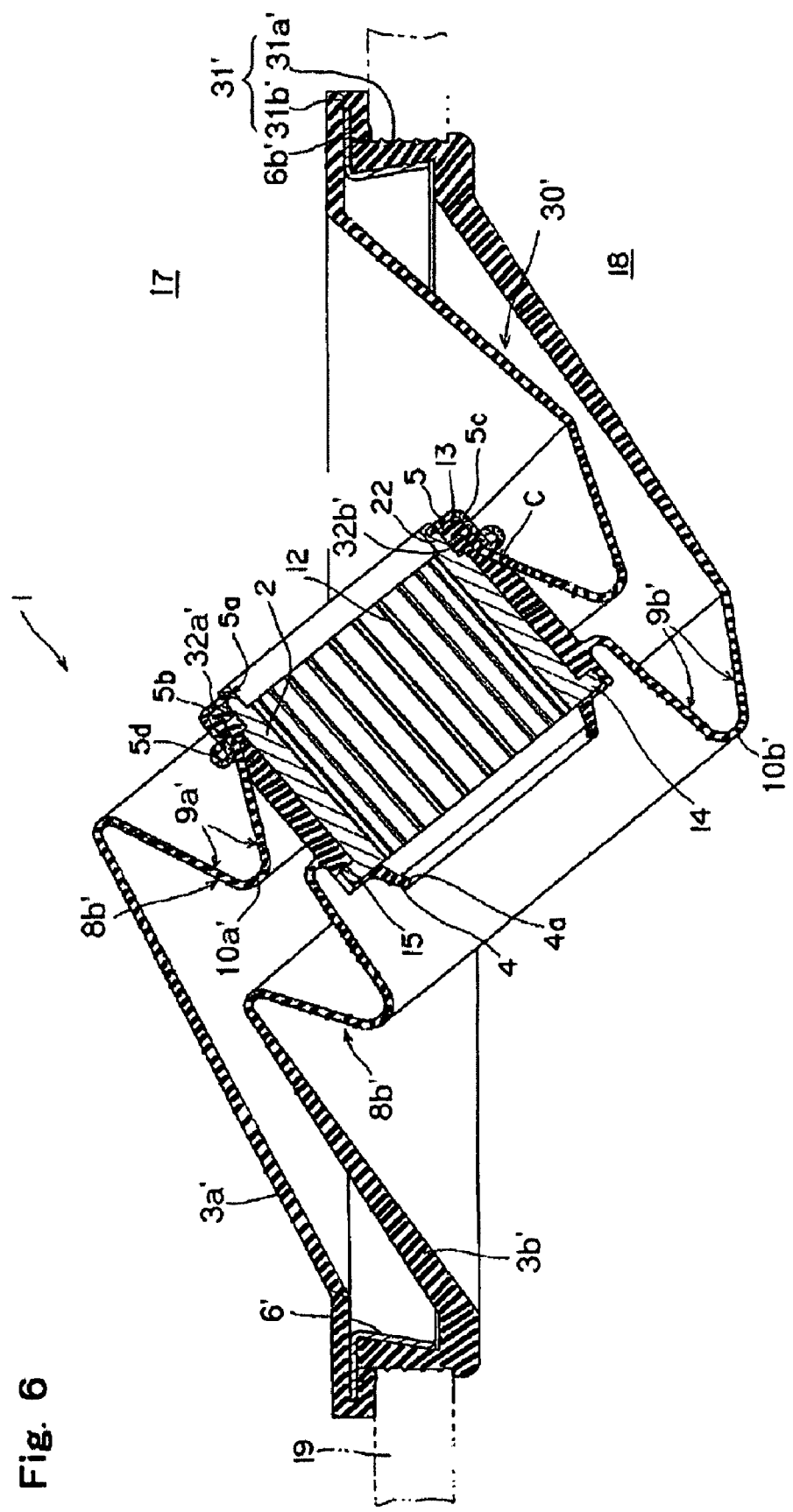
FIG. 6 is a central longitudinal section view showing a dust cover for a steering shaft according to an example of other embodiment of the present invention.
Figure 7:
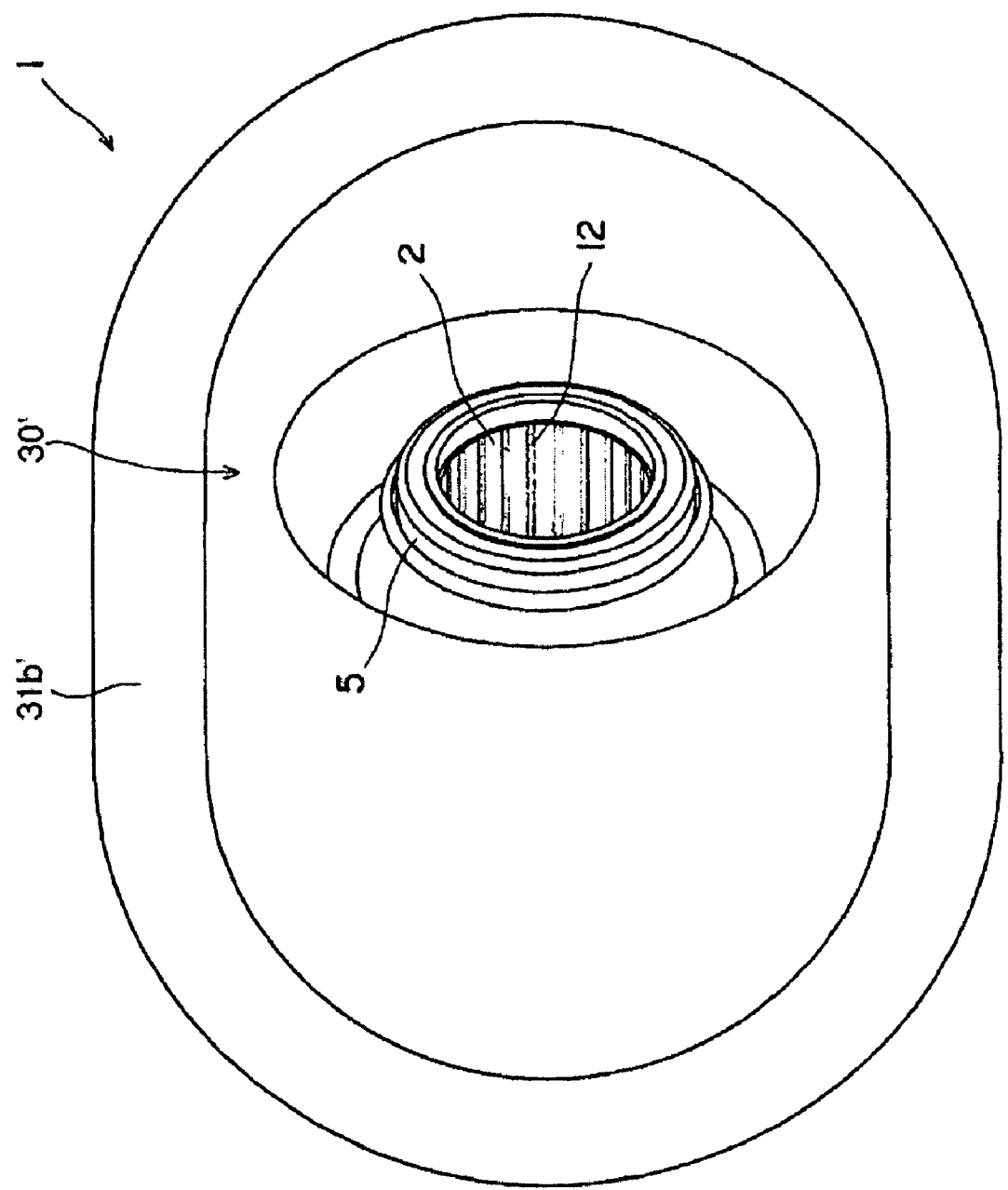
FIG. 7 is a plan view showing the dust cover for a steering shaft of FIG. 6.
Figure 8:
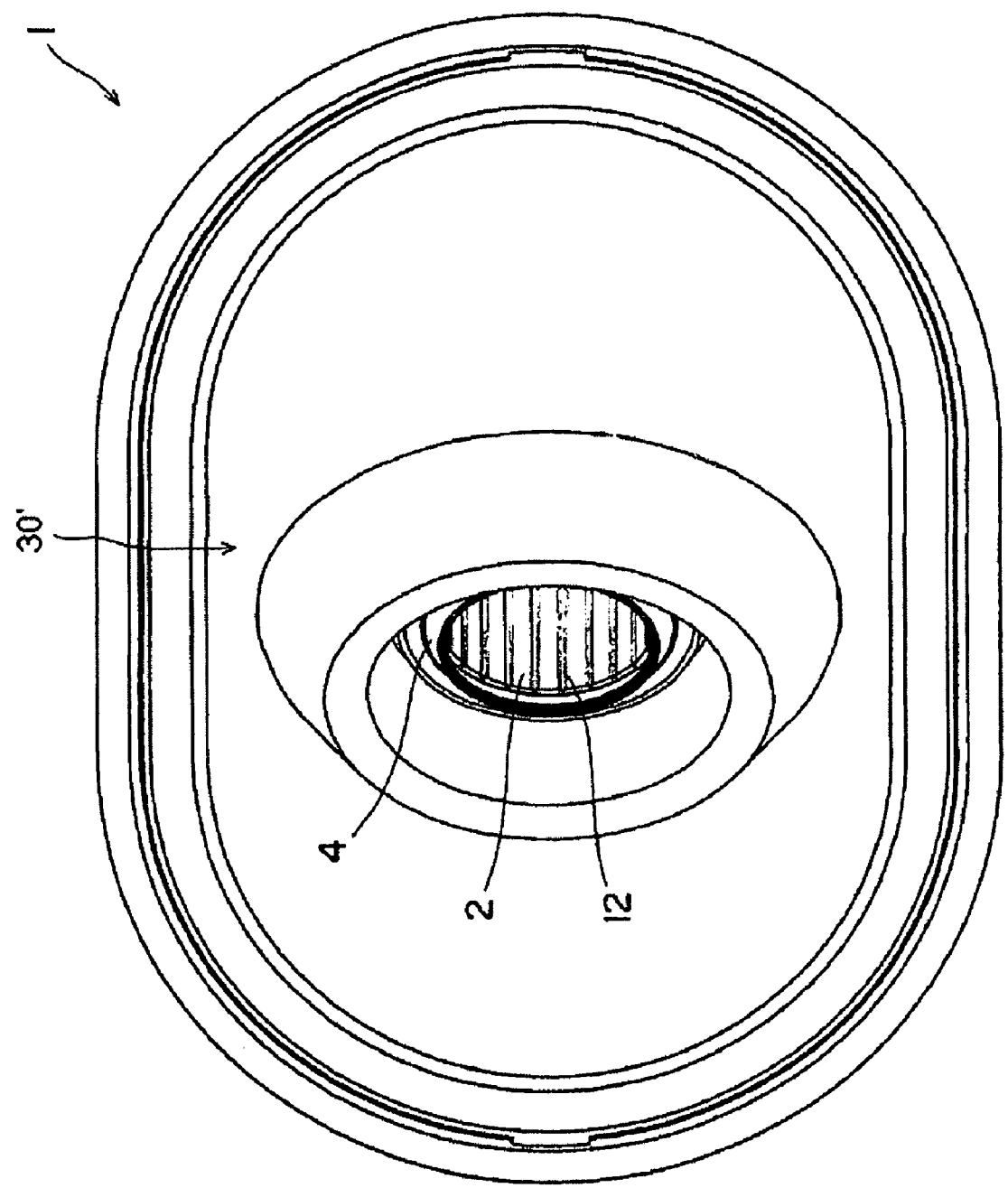
FIG. 8 is a bottom view showing the dust cover for a steering shaft of FIG. 6.

In this respect, although the above-described embodiment is an example of preferred embodiments according to the present invention, the present invention is not limited thereto, but can be carried out by modifying in various ways without departing from the gist of the invention. Depending on, for example, a requirement for space savings within the vehicle compartment 17 or for the design or the like, there may be provided a dust cover 1 for a steering shaft in which the bush 2 is in advance obliquely arranged with respect to an installation panel 19 as shown in FIGS. 6 to 8. In FIGS. 6 to 8, component elements identical to those in the above-described embodiment are designated by the identical reference numerals. In examples shown in FIGS. 6 to 8, the first bellows 3a' and the second bellows 3b' are formed as a separate member respectively, and are to be integrally combined by fitting in the end portions of the first bellows 3a' and the second bellows 3b' on their mutual outer periphery side. For example, the outer peripheral end of the first, second bellows 3a', 3b' is oblong, and they are fitted in each other with the reinforcement member 6' interposed therebetween. The outer peripheral end of the second bellows 3b' has an oblong tubular portion 31a' which abuts against the inner peripheral surface of the column hole formed on the panel 19, and the outer peripheral end of the first bellows 3a' has an oblong flange portion 31b' which abuts against the peripheral edge of the column hole formed on the panel 19. In the tubular portion 31a' of the second bellows 3b', there is fitted a reinforcement member 6', and a collar 6a' of the reinforcement member 6' is fitted in the flange portion 31b' of the first bellows 3a'. Thereby, each outer peripheral end of the first bellows 3a' and the second bellows 3b' is integrally combined, and these outer peripheral ends which are made integral become an installation portion 31' to be fitted in the panel 19. Thus, a portion for extending on the inner periphery side from each outer peripheral end of the first, second bellows 3a', 3b' supports the projected portion 8a', 8b' obliquely to the panel 19, whereby the bush 2 is supported obliquely to the panel 19 by the fixed portion 32a', 32b' of the first, second bellows 3a', 3b', and the steering shaft 20 is supported by the bush 2 such that it becomes oblique to the panel 19 initially. When a plurality of bellows 3a' and 3b' are made separate from each other as described above, and when the main body 30' of dust seal is formed using a mold, there is an advantage that pattern draw becomes easier. Furthermore, as shown in FIG. 6 the projected portions 8a', 8b' of the first and second bellows 3a', 3b' also has inclined portions 9a', 9b' and apex portions 10a', 10b'.

Also, for example, in the above-described embodiment, after the fixing member 5 is pressed into the bush 2, in which the first, second bellows 3a', 3b' is fitted, the bush 2 is plastically deformed by heating to thereby fix the fixing member 5 to the bush 2. The present invention, however, is not always limited to this example, but it may be possible, for example, to fit the fixing member 5 heated into the bush 2 in which the first, second bellows 3a', 3b' is fitted, and to fix the first, second bellows 3a', 3b' to the bush 2 in a state where the fixing member 5 is cooled and heat-shrinks, and the fixing member 5 then tightens the first, second bellows 3a', 3b' to the bush 2. Or it may be possible to fit the fixing member 5 into the bush 2, in which the first, second bellows 3a', 3b' is fitted, and by plastically deforming the fixing member 5 in this state, to fix the fixing member 5 to the bush 2 in a state where the first, second bellows 3a', 3b' is pressed against the bush 2. Also, the main body 30' of dust seal may be formed integrally with the seal lip 4 if necessary.

Further, FIGS. 9 to 16 show other embodiments. In this respect, component elements identical to those in the above-described embodiment are designated by the identical reference numerals, and detailed description will be omitted.

Figure 9:
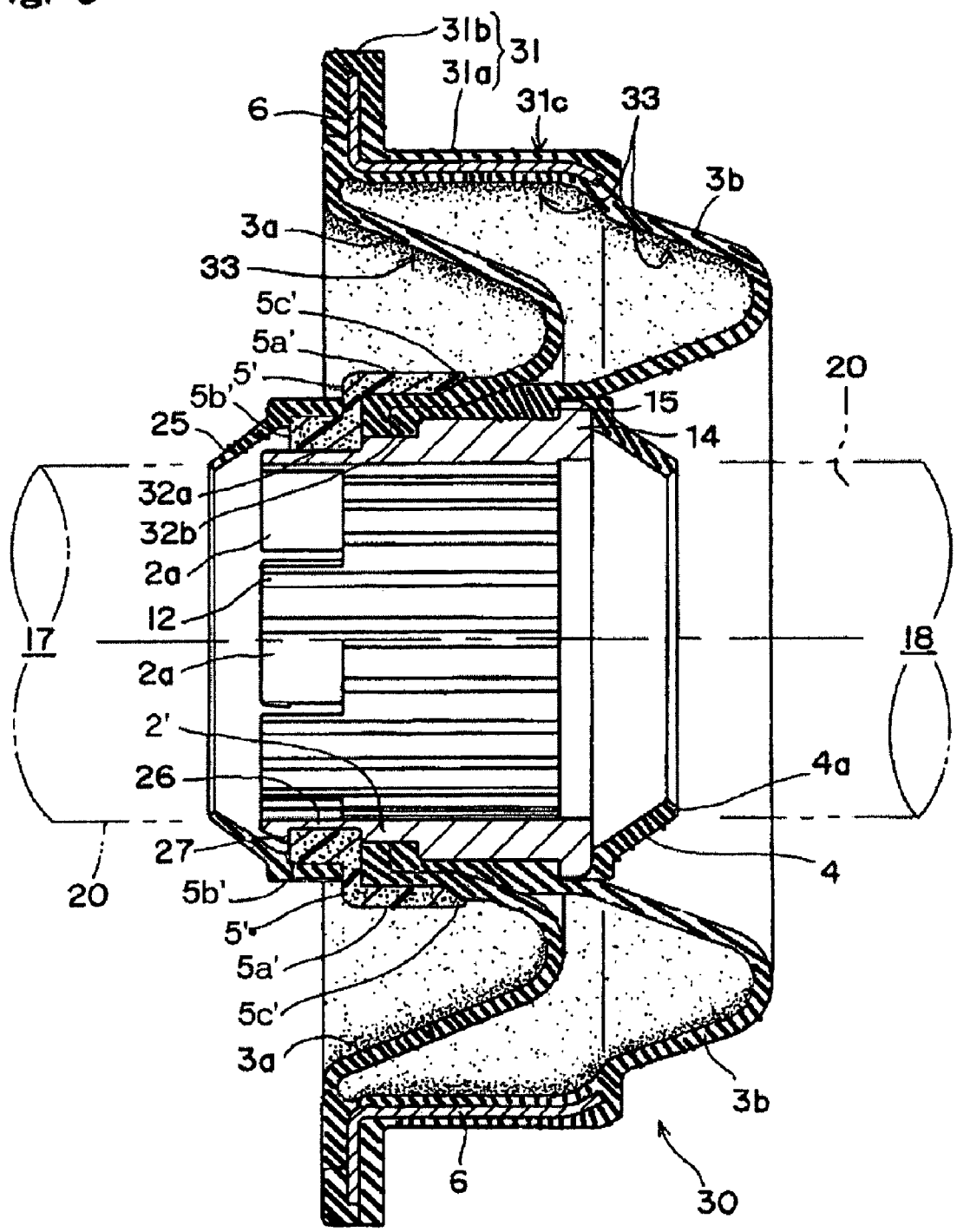
FIG. 9 is a view showing a dust cover for a steering shaft according to an example of further other embodiment of the present invention, and is a longitudinal cross-sectional view taken on line IX-IX in FIG. 10.
Figure 10:
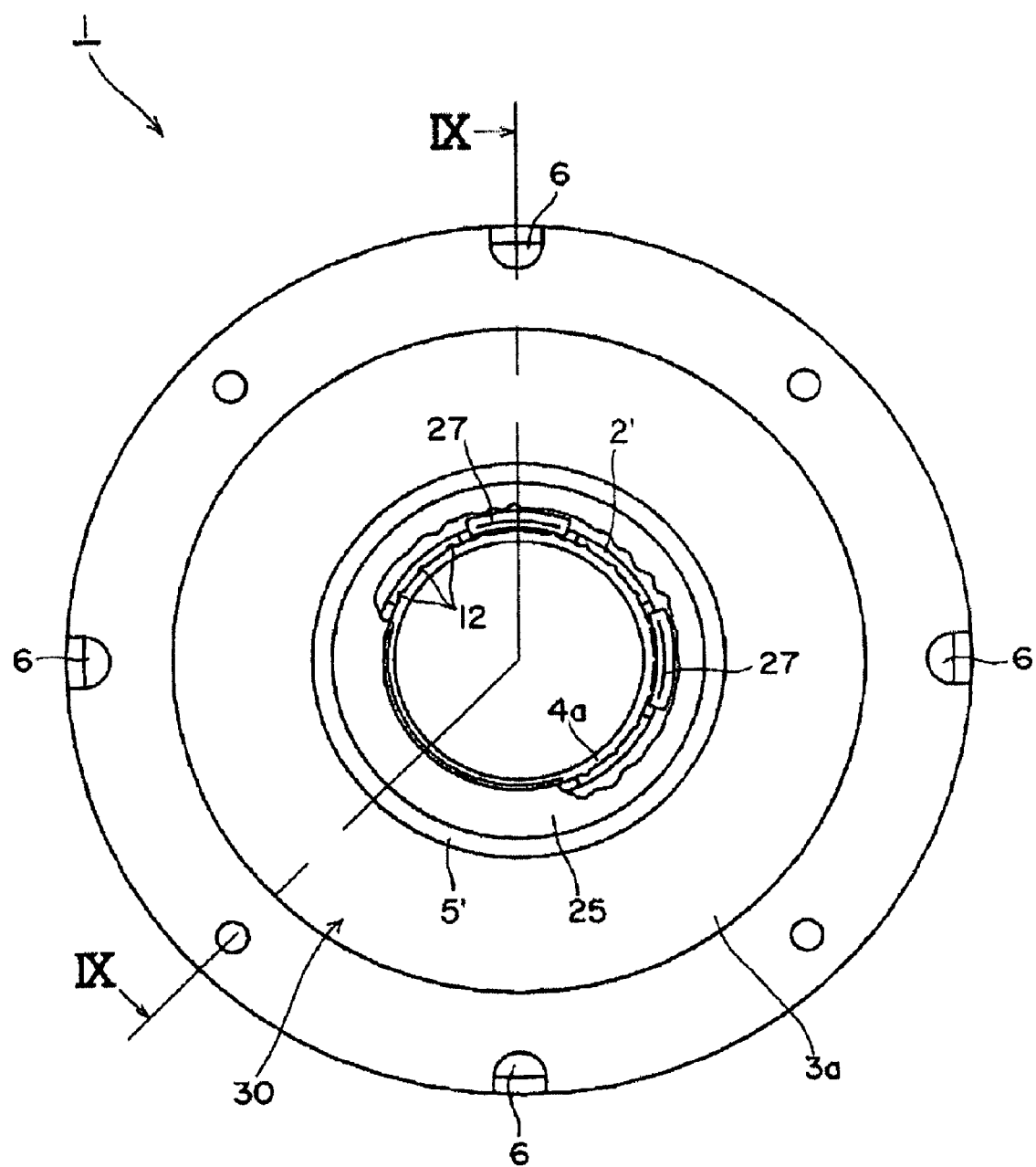
FIG. 10 is a view showing a dust cover for a steering shaft according to further other embodiment of the present invention as viewed from a vehicle compartment side.
Figure 11:
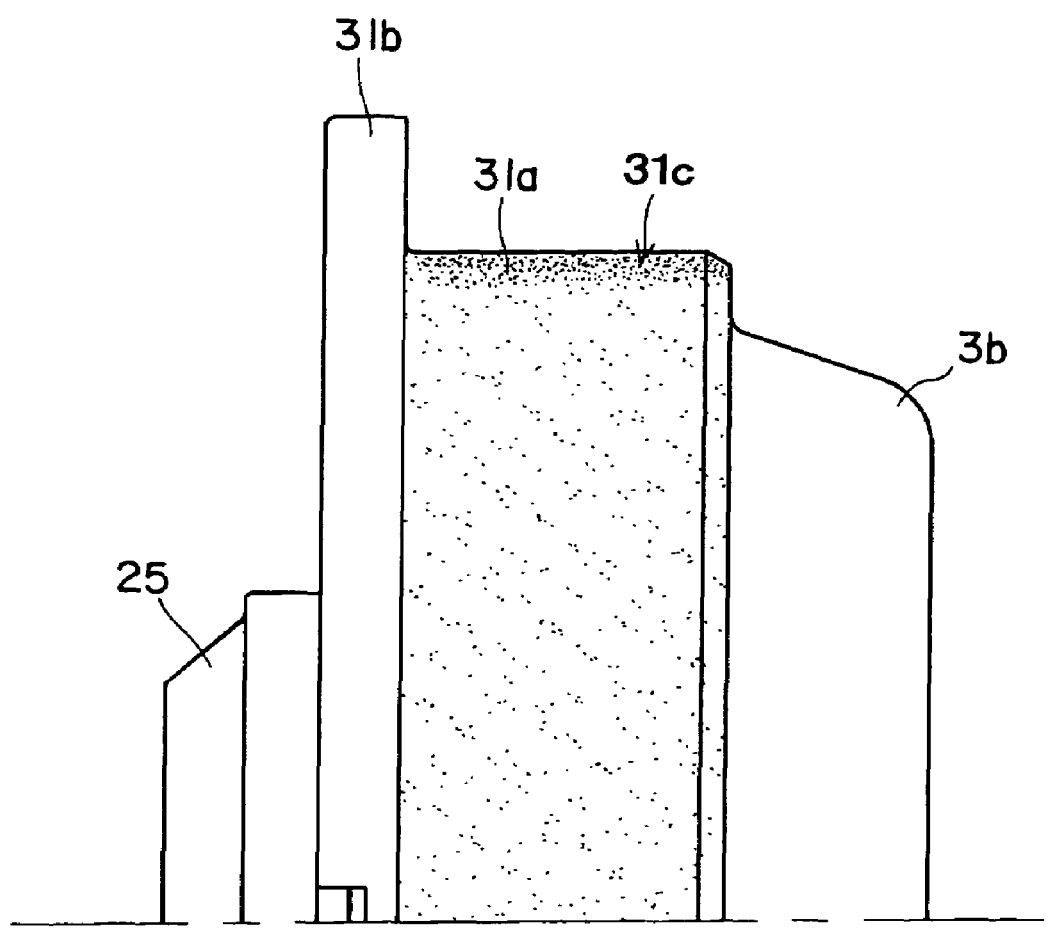
FIG. 11 shows a side view for the dust cover for a steering shaft of FIG. 9 cut in half by the central line.

In the dust cover for a steering shaft according to the present embodiment, as shown in FIG. 9, even at the end portion of the bush 2' on the vehicle compartment 17 side, there is arranged an annular seal lip 25 which is in contact with the outer peripheral surface of the steering shaft 20, and grease filled in the groove 12 in the bush 2' is sealed from both sides in corporation with the seal lip 4 arranged at the end portion on the engine room 18 side. Thereby, it becomes possible to prevent grease to be filled between the steering shaft 20 and the bush 2' from flowing out, and to sufficiently prevent stick-slip caused by grease shortages from occurring. In other words, even only the seal lip 4 arranged on the engine room 18 side of the bush 2' is capable of preventing the grease that is held on the inner peripheral surface of the bush 2' from coming off to cause insufficient lubrication, and in addition to this, a lip 25 is provided on the vehicle compartment 17 side, whereby it can be reliably realized to hold the grease between both lips 4 and 25 for sealing within the bush 2'. For this seal lip 25, for example, rubber material or elastomer excellent in sliding properties and sealing properties is preferably used as in the case of the seal lip 4, and although it is not limited to a specific material, it is suitable to use NBR (acrylonitrile-butadiene rubber). The seal lip 25 is mounted to any of the bush 2' or the fixing member 5' or the main body of dust seal, and is arranged in the vicinity of the end portion of the bush 2' on the engine room 18 side. The seal lip 25 according to the present embodiment is integrally formed together with the fixing member 5', and is provided such that it can be arranged on the engine room 18 side of the bush 2' at the moment when the fixing member 5' is mounted to the bush 2'.

Figure 15:
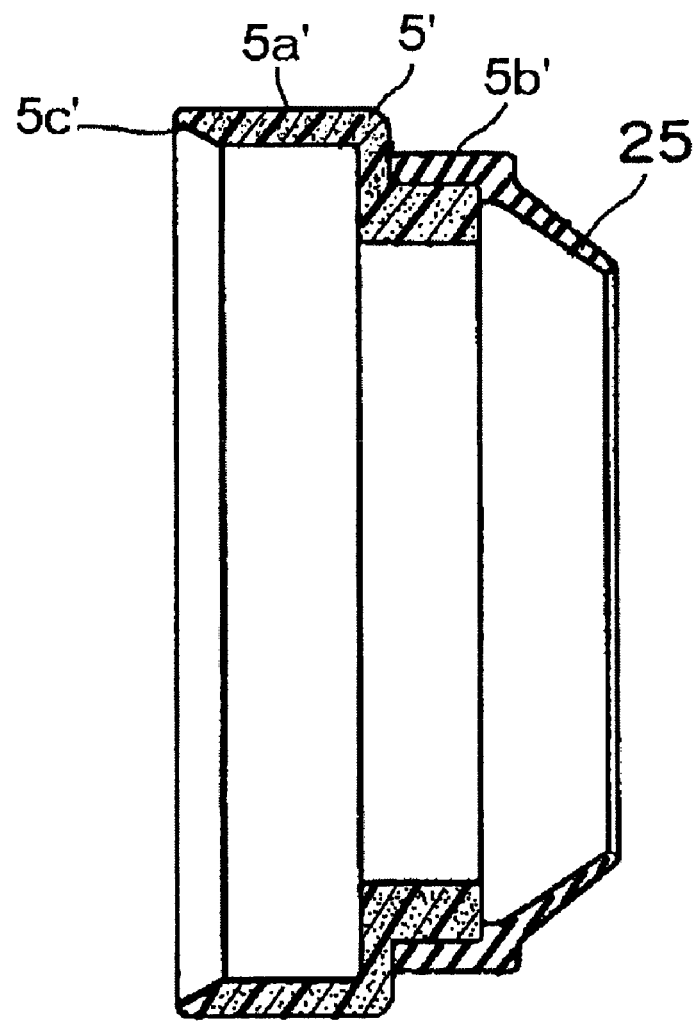
FIG. 15 is a sectional view showing shapes of a lip and a snap ring in the dust cover for a steering shaft shown in FIG. 9.
Figure 16:
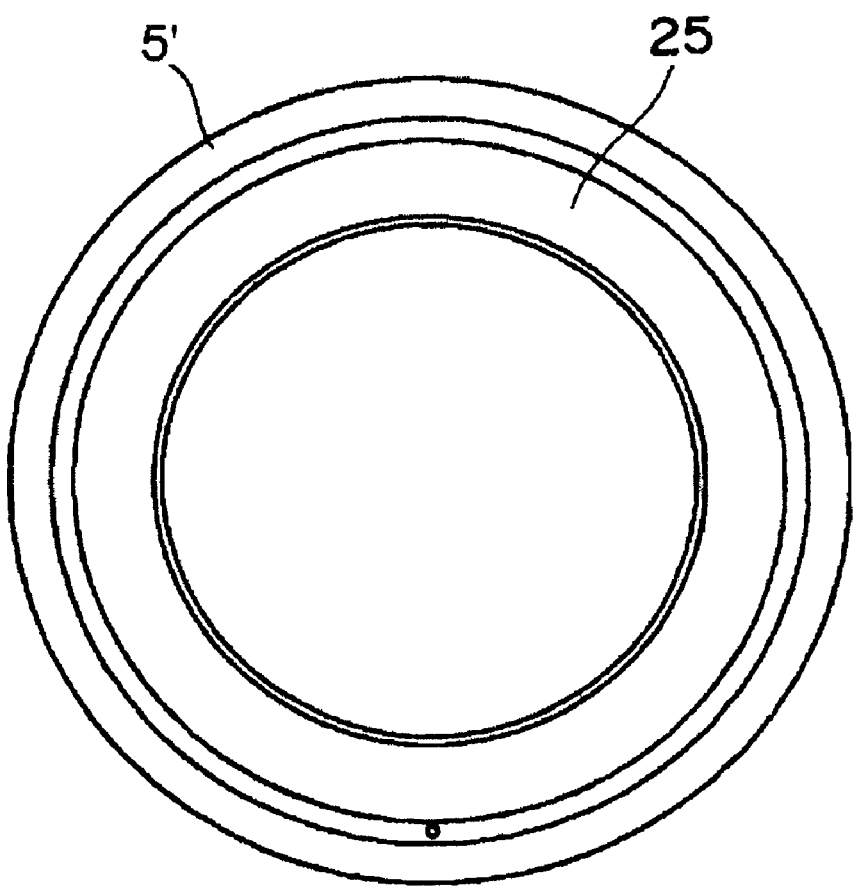
FIG. 16 is a view for the lip and the snap ring shown in FIG. 15 as viewed from the vehicle compartment side.
Figure 17:
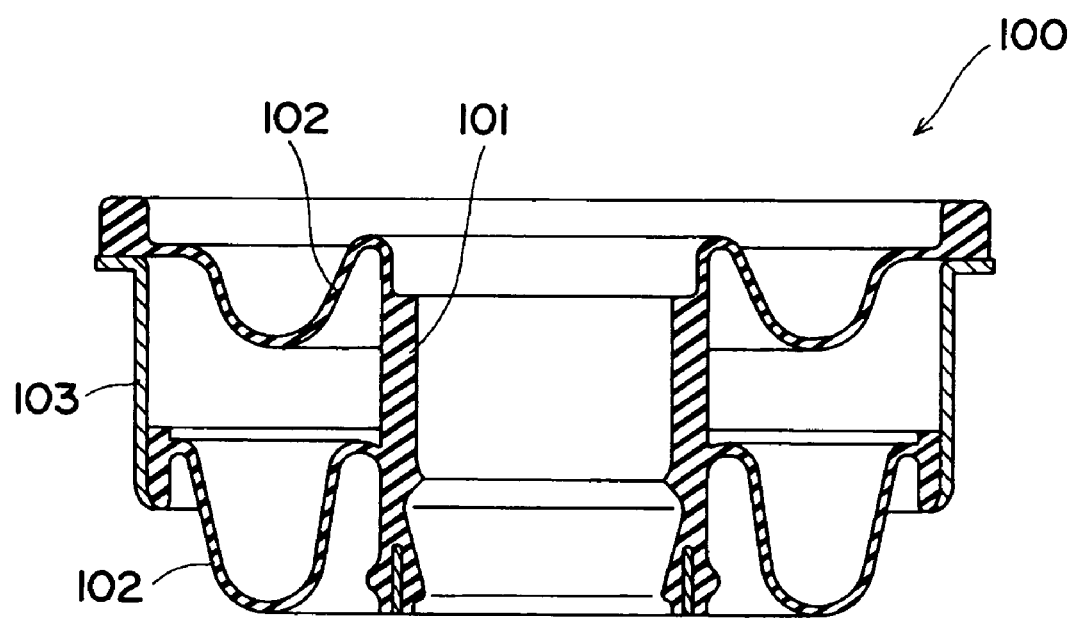
FIG. 17 is a central longitudinal section showing a conventional dust cover for a steering shaft.

Also, the fixing member 5' according to the present embodiment is formed by synthetic resin, for example, polyamide resin. As shown in FIGS. 9 and 15, the fixing member 5' is shaped like a stepped ring having a large-diameter tube portion 5a' for holding an inside diameter side end portion of the bellows portion 3a, 3b, and a small-diameter tube portion 5b' for directly fitting in the bush 2', and has a taper-shape having a tip edge being a curved surface such that a tip opening edge 5c' of the large-diameter tube portion 5a' does not become sharpness to abut against the bellows 3. When the fixing member 5' of such a shape is mounted to the bush 2', in the large-diameter tube portion 5a', each fixed portion 32a, 32b of the first and second bellows 3a and 3b is tightened in a partially overlapped state between the large-diameter tube portion 5a' and the bush 2' for holding (See FIG. 9). Thereby, since the inner peripheral end 32a, 32b of each bellows 3a, 3b is further tightened by the fixing member 5' with the bush 2' in a state where it is fitted in the bush 2', the bellows 3a, 3b can be reliably fastened to the bush 2'. Moreover, since the tightening force by the fixing member 5' is received by the bush 2', the smooth rotation of the steering shaft 20 is not prevented. In this case, on the fixing member 5' according to the present embodiment, there is integrally provided the lip 25. Specifically, as shown in FIGS. 15 and 16, the fixing member 5' made of polyamide resin obtained by injection molding in advance is contained within a mold of the lip 25 in a state where a surface in which the lip 25 fits, for example, the outer peripheral surface of the small-diameter tube portion 5b' is coated with adhesive, and the lip 25 is vulcanized and molded with the fixing member 5b' as core material, whereby it is to be formed integrally with the fixing member 5'.

Figure 12:
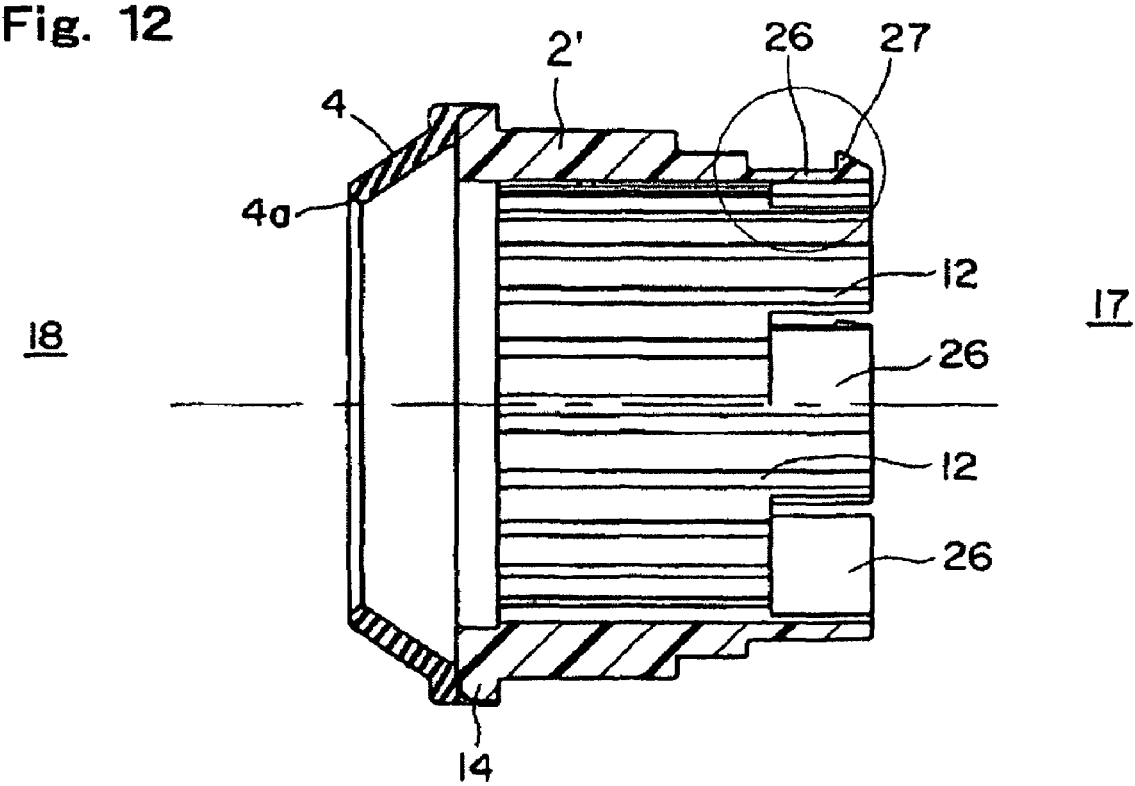
FIG. 12 is a cross-sectional view showing a shape of a bush in the dust cover for a steering shaft shown in FIG. 9.
Figure 13:
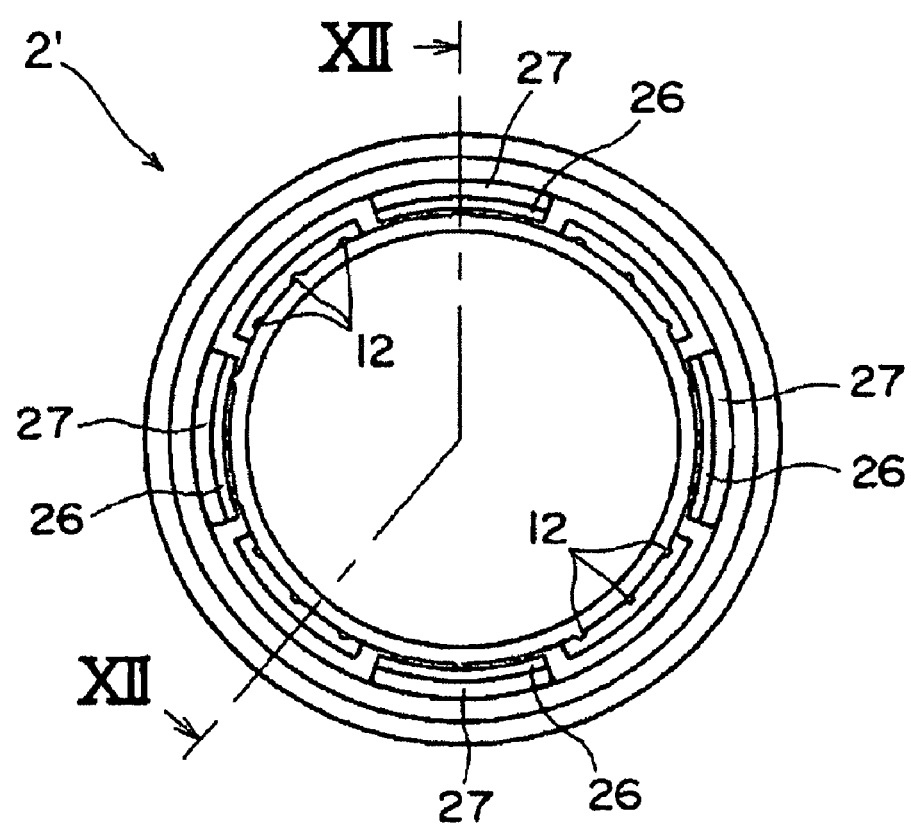
FIG. 13 is a view showing the bush shown in FIG. 12 as viewed from the vehicle compartment side.
Figure 14:
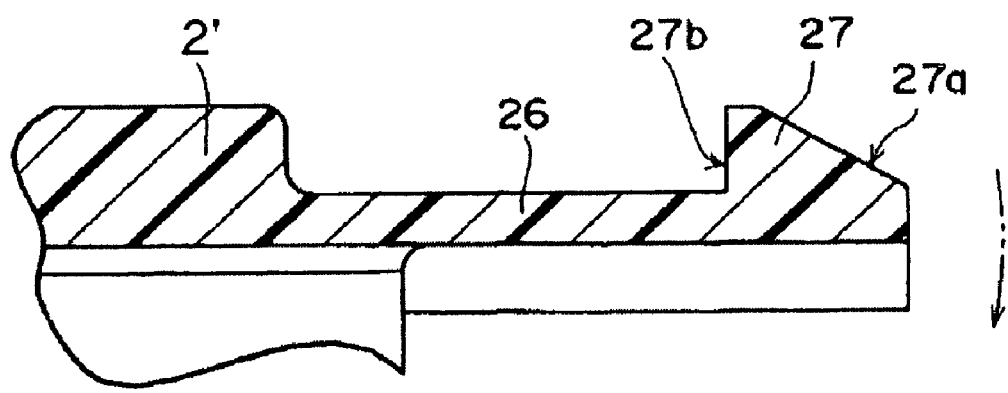
FIG. 14 is an enlarged view showing the snap portion in FIG. 12.

Also, in the dust cover for a steering shaft according to the present embodiment, as shown in FIGS. 9, 12 and 14, as structure in which the fixing member 5' is mounted to the bush 2', there is adopted a snap lock type which fixes when the fixing member 5' is pressed into a predetermined position. In other words, the end portion of the bush 2' on the vehicle compartment 17 side is provided with a hook 26 which is elastically deformed in a radial direction, whereby when a ring-shaped fixing member 5' is fitted in, the tip of the hook 26 bends inwardly in the radial direction, after the fixing member 5' passes, the hook tip returns to the original position, the tip of the hook 26 is caught in the rear end of the fixing member 5' which functions to prevent the fixing member 5' fitted in the bush 2' from coming off. At the tip of the hook 26 there is provided a pawl portion 27 having an inclined surface 27a which comes into contact with the front end edge of the inner peripheral surface of the small-diameter tube portion 5b' of the fixing member 5' when the fixing member 5' is inserted, and a vertical surface 27b which abuts against the rear end surface of the small-diameter tube portion 5b' of the fixing member 5' after inserted. If the hook 26 is provided at least at one place, It will be possible to prevent the fixing member 5' from coming off, but preferably a plurality of the hooks 26 are provided, or more preferably, they are provided at four places every 90°. According to this system of mounting, when pressing the fixing member 5', by a force toward the inside in a radial direction by the front end edge of the inner peripheral surface of the small-diameter tube portion 5b' of the fixing member 5' abutting against the inclined surface 27a of the pawl portion 27, the hook 26 including the pawl portion 27 sags down as a whole inwardly in a radial direction to allow the fixing member 5' to be inserted through, and when further fixing member 5' is pressed in and the pawl portion 27 is completely exceeded (when the predetermined fitted-in position is reached), the hook 26 elastically returns so that the pawl portion 27 is caught by the rear end surface of the small-diameter tube portion 5b' of the fixing member 5', the fixing member 5' is fixed to prevent it from coming off (See FIGS. 9 and 10). Since only by pressing the fixing member 5' to the bush 2' the pawl portion 27 of the hook 26 is automatically caught by the edge of the fixing member 5' and the mounting operation is completed by fixing the fixing member 5', the operation becomes simpler and more convenient, and the assembly man-hour or processes can be reduced. In this respect, this snap-lock system method for fixing the fixing member 5' is not limited to the above-described fixing member made of resin but is also applicable to a cylindrical member obtained by press drawing a metallic plate as in the case of the above described embodiment.

Further, a surface (See FIGS. 3 and 11) with which an fixing area 31 of the main body 30 of dust seal made of rubber fits in the inner peripheral surface of the hole cover 23 that is the outer peripheral surface 31c of the tubular portion 31a, preferably comprise a rough surface, shown by the pattern of several small dots in FIG. 9, that reduces a contact area and hence the coefficient of friction, thereby improving fixing properties. In other words, in order to maintain the sealing properties or a fixing force, there may be cases where the outside diameter (outside diameter of the fixing area 31) of the dust cover 1 for a steering shaft is made larger than the inside diameter of the column hole 24 of the panel 19 to thereby conduct tight fit. In such a case, since the surface of the fixing area 31 of the main body 30 of dust seal made of rubber is difficult to slip, and it becomes difficult to install the dust cover 1 for a steering shaft to the panel 19, the workability is supposed to be deteriorated accordingly. If, however, the fitted-in portion (outer peripheral surface 31c of the tubular portion 31a) of the dust cover 1 for a steering shaft to the hole cover 23 is provided with fine concave and convex portions to have a rough surface for reducing the coefficient of friction (in other words, reduce the contact area) in advance, it will become easier that much to install. Moreover, since the interference itself is not changed even if it is made easier to install as. described above, the sealing properties and the fixing force will not be affected. Such fine concave and convex portions can be provided by etching treatment (chemical treatment) for etching the surface of seal forming mold by the action of chemicals, honing treatment (physical treatment) that blows off sand, glass beads and the like onto the surface of an object physically, embossing and the like. Such fine concave and convex portions or shallow concave and convex surfaces are well known as satin finish, graining or the like. Note that these concave and convex portions on the surface may be such that the coefficient of friction is reduced in such a degree as to be able to enhance the workability when installing the fixing area of the main body of dust seal made of rubber of the dust cover for a steering shaft, in other words, to reduce the contact area, and the shape of those concave and convex portions or size and depth of those concave and convex portions are not particularly limited.

Also, a portion, at which at least bellows themselves of a plurality of bellows 3a and 3b of the main body 30 of dust seal can come into contact with each other or is in contact between the same bellows, preferably has fine concave and convex portions or shallow concave and convex portions in advance to prevent adhesion between these. In the dust cover 1 for a steering shaft provided with a plurality of bellows 3a and 3b having such projected portions 8a and 8b with the inclined portions 9a and 9b and the apex portions 10a and 10b as shown in FIG. 1 or FIG. 9, during the operation of, for example, obliquely moving the steering shaft 20, there is a possibility that two pairs of bellows 3a and 3b come into close contact with each other, or an inside diameter-side inclined portion and an outside diameter-side inclined portion on the inner surface of the same bellows 3a or 3b come into close contact with each other, and in such a case, there is a problem that offensive sounds may possibly occur when those close contact portions separate from each other. Thus, portions 33, in which there is at least a possibility that they come into close contact with each other, may be provided with the above-described fine concave and convex portions to thereby have a rough surface in which the mutual contact area can be made smaller in advance, whereby it is possible to prevent the mutual adhesion for avoiding offensive sounds. Such concave and convex portions can be provided by forming concave and convex configuration such as fine satin and graining by etching treatment (chemical treatment) for etching the surface of, for example, a seal forming mold by the action of chemicals, honing treatment (physical treatment) that blows off sand, glass beads and the like onto the surface of an object physically, and the like as the outer peripheral surface of the above-described tubular portion 31a is treated.

The invention claimed is:

1. A dust cover for a steering shaft for closing a column hole between a steering shaft penetrating the column hole provided on a panel which separates an engine room and a vehicle compartment, and the panel, comprising:
    a bush made of low frictional material, through which the steering shaft penetrates;
    a main body of dust seal made of rubber, provided with a plurality of bellows in an axial direction of the steering shaft and arranged between the bush and the panel, for sealing a clearance thereof, said main body of dust seal further comprising a tubular reinforcement member integrally formed within a peripheral installation portion;
    an annular seal lip arranged at least on the engine room side of the bush, in contact with an outer peripheral surface of the steering shaft; and
    a fixing member for surrounding end portions of the plurality of bellows on the inner periphery side, and tightening the end portions on the inner periphery side to fix the plurality of bellows to the bush.

2. The dust cover for a steering shaft according to claim 1, wherein the fixing member is fixed to the bush by caulking an end portion of the bush on the inner periphery side in a state where the fixing member is fitted in the bush and the end portions of the plurality of bellows on the inner periphery side.

3. The dust cover for a steering shaft according to claim 1, wherein a hook is provided at an end portion of the bush, the hook being elastically deformed in a radial direction to allow the fixing member to pass through the hook when the fixing member is fitted into the end portion of the bush, the hook serving to prevent the fixing member fitted in the bush from coming off with a tip of the hook caught by the end portion of the fixing member after the fixing member is fitted into the bush, and the hook being used for fixing the fixing member by snap locking.

4. The dust cover for a steering shaft according to claim 1, wherein an edge of the fixing member for pressing the bellows is curled outside.

5. A dust cover for a steering shaft for closing a column hole between a steering shaft penetrating the column hole provided on a panel which separates an engine room and a vehicle compartment, and the panel, comprising:
- a bush made of low frictional material, through which the steering shaft penetrates;
- a main body of dust seal made of rubber, provided with a plurality of bellows in an axial direction of the steering shaft and arranged between the bush and the panel, for sealing a clearance thereof, said main body of dust seal further comprising a tubular reinforcement member integrally formed within a peripheral installation portion;
- an annular seal lip arranged at least on the engine room side of the bush, in contact with an outer peripheral surface of the steering shaft;
- the bellows having at least one annular projected portion projecting toward either the engine room side or the vehicle compartment side, and the projected portion being formed of two inclined portions which incline in an opposite direction to each other with respect to the bush axis between an end portion on an inner periphery side and an end portion on an outer periphery side; and
- one apex portion formed by a curved surface continuously joining the inclined portions.

6. The dust cover for a steering shaft according to claim 5, wherein a portion of an inclined portion of the bellows which is closest to the vehicle compartment side in the vicinity of end portions of the plurality of bellows on the inner periphery side is in contact with a portion of other bellows in an initial state where no external force is exerted.

7. The dust cover for a steering shaft according to claim 5, wherein the projected portion projects toward the engine room side, and a curvature of the apex portion of the bellows which is closest to the vehicle compartment side is larger than a curvature of an apex portion of other bellows.

8. The dust cover for a steering shaft according to claim 5, wherein an apex portion of the projected portion is formed close to the end portion on the inner periphery side of the bellows or close to the end portion on the outer periphery side of the bellows.

9. The dust cover for a steering shaft according to claim 5, wherein a circular groove is formed on the end portion on the outer periphery side of the bellows which is close to the engine room side or the vehicle compartment side.

* * * * *